March 21, 1967  S. I. CALDWELL  3,309,942
PUSH-PULL HANDWHEEL AND MOTOR DRIVE
Filed May 27, 1965  3 Sheets-Sheet 1

INVENTOR.
Samuel I. Caldwell,
BY
Paul & Paul
ATTORNEYS.

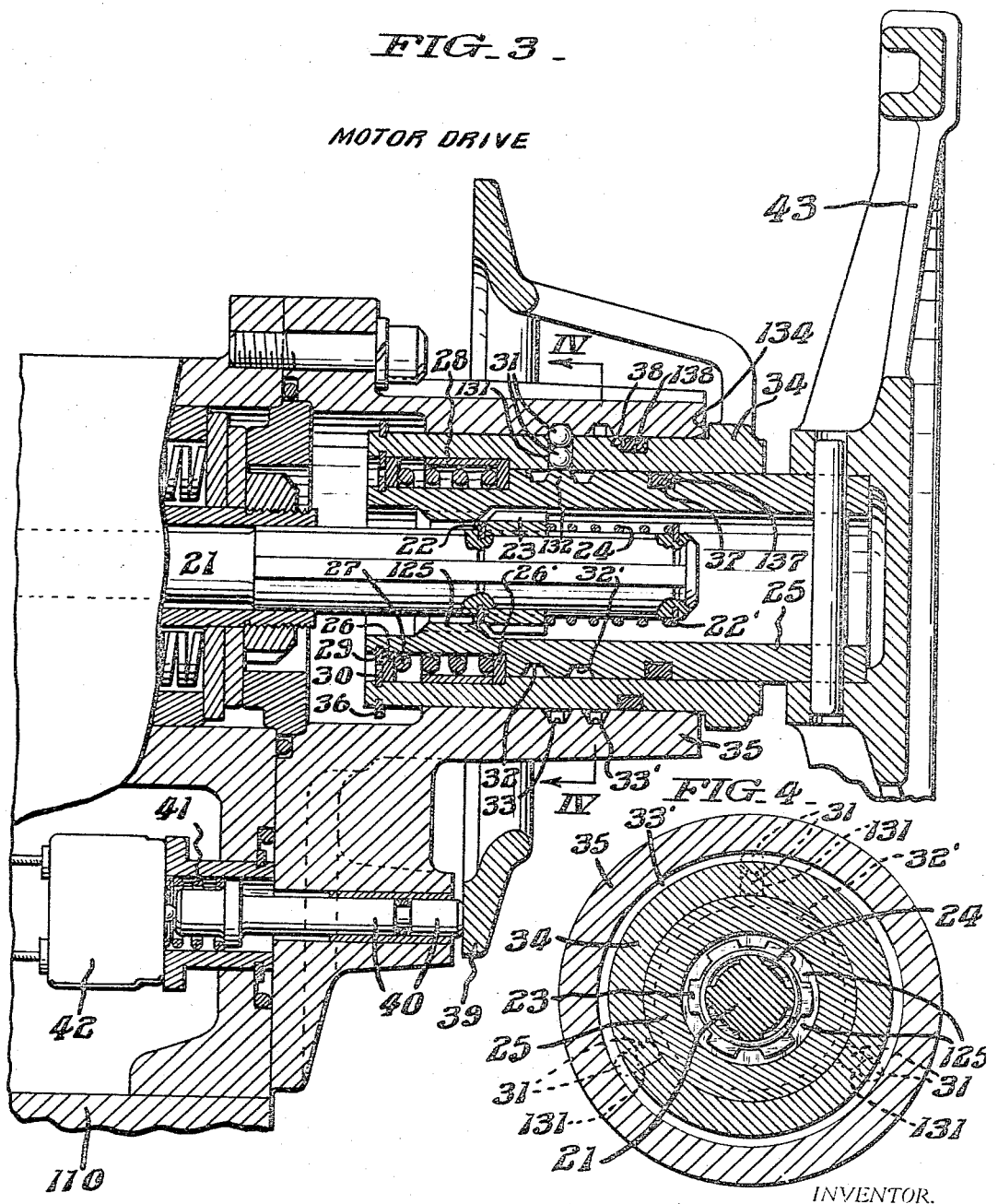

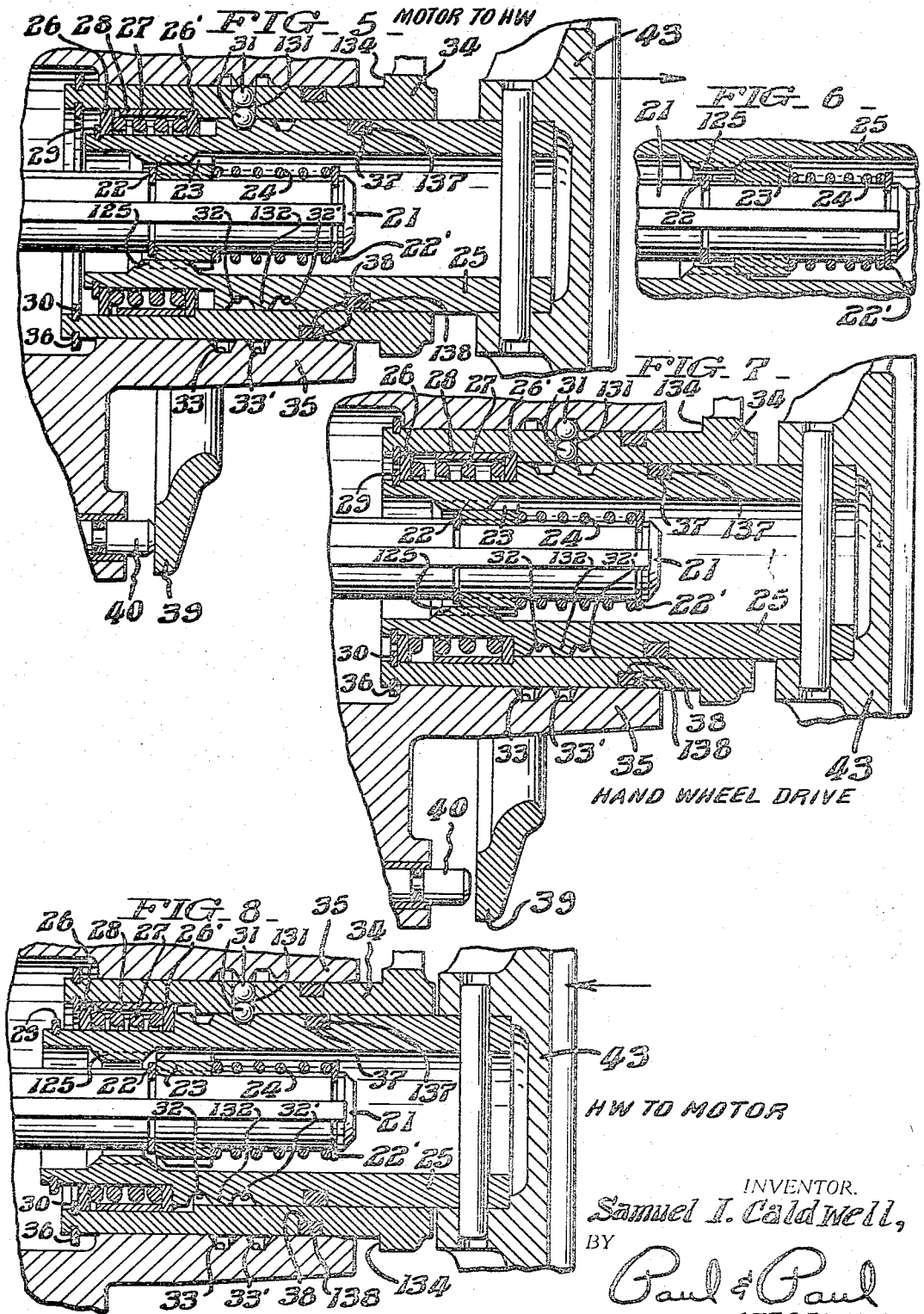

United States Patent Office 3,309,942
Patented Mar. 21, 1967

3,309,942
PUSH-PULL HANDWHEEL AND MOTOR DRIVE
Samuel I. Caldwell, Drexel Hill, Pa., assignor to King of Prussia Research and Development Corporation, King of Prussia, Pa., a corporation of Pennsylvania
Filed May 27, 1965, Ser. No. 459,204
19 Claims. (Cl. 74—625)

This invention relates to mechanical drives wherein the power for operation may be derived selectively from either a motor or from a manually operated handwheel. It would obviously be undesirable, even dangerous, to allow both the motor and handwheel to be simultaneously coupled to the drive.

An important object of the present invention is to provide safe dependable means for selectively disconnecting the motor drive power and connecting the handwheel drive, and for selectively disconnecting the handwheel drive and connecting the motor drive power.

Another object is to provide means whereby the selective drive shift may be accomplished repeatedly without the necessity of aligning coupling parts prior to executing the shift.

A further object is to eliminate the need for a separate shift lever to achieve the transfer of power.

Another object is to furnish positive positioning of component parts to assure proper functioning without increasing the manual effort required to operate the drive.

These and other associated objects are attained by the components and arrangements comprising the present invention, a preferred embodiment of which is illustrated and described herein. Various modifications in construction details and arrangements are comprehended within the scope of the invention as defined in the appended claims.

Referring to the illustrations:

FIG. 3 illustrates a preferred embodiment of the drive shown in axial section along the driven shaft which is common to both motor and handwheel drive. In FIG. 3, the components are shown in motor drive, i.e., in position such that the motor powers the drive;

FIG. 4 is a view in section looking along the line IV—IV in FIG. 3 in the direction of the arrows;

FIG. 5 is a view in section generally similar to FIG. 3 but showing the components in a position intermediate the motor drive and handwheel drive extremes, as the shift progresses from motor drive toward the handwheel drive position;

FIG. 6 is a view in section showing the condition when the splines of the handwheel drive sleeve do not mate with the splines of the coupling;

FIG. 7 is a view similar to FIG. 5 but showing the components positioned solely for handwheel actuation; and FIG. 8 is a view similar to FIG. 5 except that it illustrates the shift progressing from handwheel drive toward the motor drive position.

*General*

Figure 1:
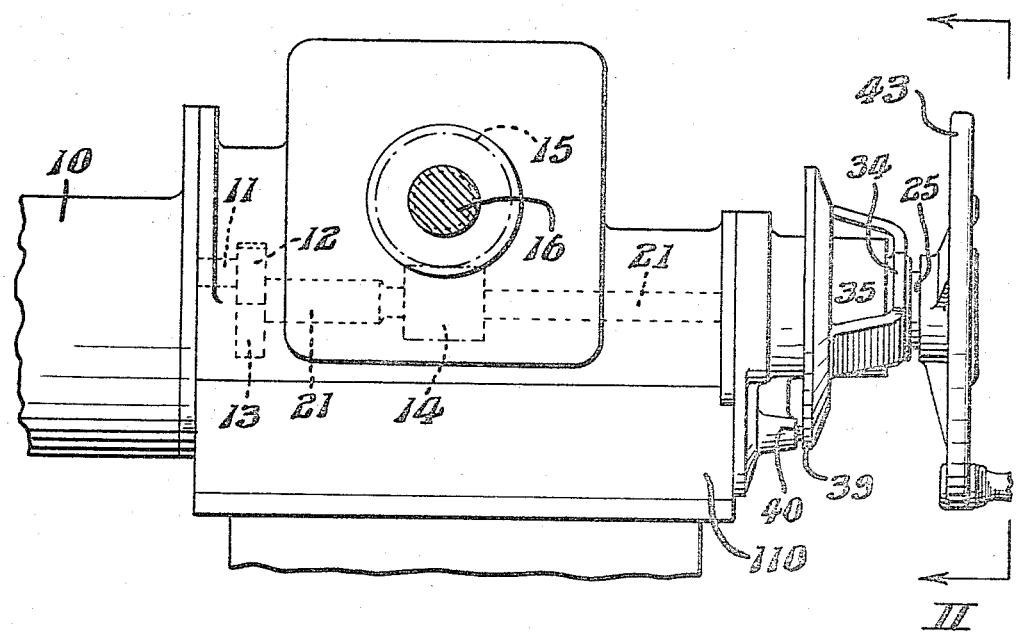
FIG. 1 is a plan view of a mechanical drive in which the power may be derived selectively from a motor (located at the left) or from the handwheel (at the right)
Figure 2:
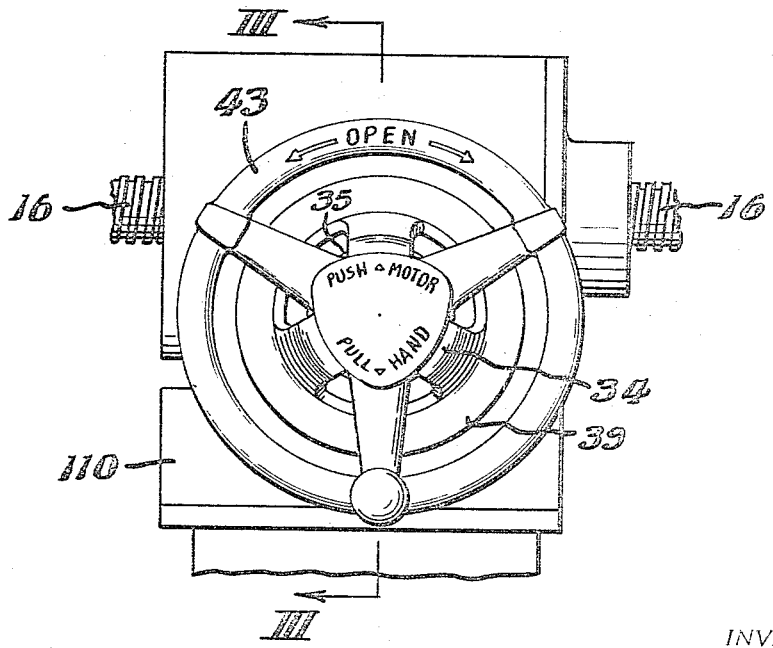
FIG. 2 is an end view looking in from the right along the line II—II in FIG. 1 in the direction of the arrows.

Referring first to FIG. 1, worm shaft 21 is adapted to be driven either by a motor drive or by a manually operated handwheel, according to the position of the drive mechanism provided by the present invention and described hereinafter in detail. The motor drive is illustrated as comprising a flange-mounted motor 10 which drives an input shaft 11 shown coupled to worm shaft 21 through helical or other suitable gears 12 and 13. A worm 14, fixed to shaft 21, is shown meshed with a worm wheel 15 splined or otherwise fixed to the load shaft 16 which is to be driven by the motor drive or handwheel drive.

*Parts descriptions*

Referring now to FIG. 3, the worm shaft 21 is furnished with external splines (as seen best in FIG. 4) and is grooved annularly to accept retaining rings 22 and 22'. A coupling 23 is slidably mounted on the worm shaft splines and is normally held against the inner retaining ring 22 by the force exerted by coupling spring 24 against the outer face of the coupling 23 and the inner face of the retaining ring 22'. The periphery of the coupling 23 constitutes another spline, as best seen in FIG. 4. The inwardly-directed face of the coupling 23 is beveled in cooperation with the periphery to a depth which is below the root diameter of the external splines. The handwheel drive sleeve 25, which has affixed to it the handwheel 43, is furnished in its otherwise plain bore with internal splines 125 slidably engageable with the external splines of the coupling 23. Both ends of splines 125 are beveled or chamfered in concordance with the bevel on the coupling 23. The tubular handwheel drive sleeve 25 is of reduced diameter at its inward end and its periphery is grooved annularly to accept a retaining ring 29 against which bears thrust washer 26 which is one of a pair of identical thrust washers 26 and 26'. Intermediate the two thrust washers 26 and 26' is a helical compression centralizing spring 27 which urges thrust washer 26 against retaining ring 29 and which urges thrust washer 26' against the shoulder provided on the handwheel drive sleeve 25 at the end of the reduced diameter portion.

Surrounding the centralizing spring 27, and also intermediate the two thrust washers 26 and 26' is a tubular spring stop 28 whose function is to limit the travel of either of the slidably mounted thrust washers 26, 26', relative to the handwheel drive sleeve 25 and the switch flange 34 which contains the centralizing spring subassembly in its counter-bored end and captivates the subassembly between its counter-bore shoulder and retaining ring 30 which resides in the internal annular groove provided at the inward end of the switch flange 34. This arrangement effectively allows limited relative axial motion between the handwheel drive sleeve 25 and the switch flange 34, but does not prevent relative rotation between these two parts, 25 and 34.

Axially outward from, but close to, the shoulder against which thrust washer 26' bears, the handwheel drive sleeve 25 is provided with two annular grooves 32 and 32' parallel to each other and also parallel to the shoulder. Both grooves completely encircle the handwheel drive sleeve 25. The grooves 32 and 32' are of inverted isosceles trapezoidal cross section with the outermost part of the groove being also the widest, with the consequence that the material or land 132 between the grooves also has an isosceles trapezoidal cross section but which is in inversion to those of the grooves 32, 32', the nonparallel legs of the land 132 being formed by the adjacent leg of each of the grooves. Further outward axially along the periphery of the handwheel drive sleeve 25 is another annular groove 37, but groove 37 is of approximately rectangular cross section for accepting a lubricant-retaining seal 137 which is in deflective contact with both the handwheel drive sleeve 25 and the bore of the switch flange 34.

A multiplicity of locking balls 31 are slidably confined in a plurality of cylindrical holes 131 which extend radially through the tubular portion of the switch flange 34. Three such holes are shown in FIG. 4 at 120° spacing, containing a total of six locking balls 31. Holes 131 are so situate axially that when the thrust washer 26' simultaneously bears against the shoulders of the handwheel drive sleeve 25 and of the counterbore of switch flange 34, the holes 131, and the locking balls 31, lie at the position of land 132, i.e., midway between the grooves 32 and 32'. The locking balls 31 have a diameter approximately equal to twice the radial depth of the grooves 32 and 32'. Located further axially along the periphery of the tubular portion of the switch flange 34 in the direction toward the handwheel 43 is a groove 38 of generally rectangular cross section which accommodates a seal 138 similar in purpose to that of seal 137. Further in the same direction is a shoulder 134 on the switch flange 34 for limiting axial motion of that member relative to the cartridge cap 35 in whose bore the switch flange 34 is slidably and rotatively mounted. Limiting the axial motion of switch flange 34 in the opposite direction, relative to the cartridge cap 35, is another retaining ring 36 situated in an annular groove at the opposite end of the tubular portion of the switch flange 34.

Centrally located in the bore of the cartridge cap 35 are two annular grooves 33 and 33', similar in cross section and purpose to the grooves 32 and 32', but inversely positioned relative to them. The wall of the tubular portion of the switch flange 34 in the vicinity of the locking ball holes, is, in the particular preferred embodiment illustrated, of a radial thickness approximately equal to one and one-half ball diameters, so that two balls 31 can not simultaneously be completely within any one of the holes 131.

Cartridge cap 35 serves as an enclosure for the mechanical drive of the present invention, and as a partial enclosure for the driven mechanism including shaft 21, and also as a support and guide for the switch plunger 40 which is slidably biased outwardly by switch spring 41. A switch 42 is so located within a compartment of the driven-mechanism housing 110 that its plunger 40 is in agreement with the skirted portion 39 of the switch flange 34. Thus, switch 42 is actuated to complete the motor electrical circuit whenever the switch flange 34 is in its extreme inward position, as illustrated in FIG. 3, and is actuated to break the motor electrical circuit prior to the switch flange 34 assuming its extreme outward position, as illustrated in FIG. 7.

The extreme left end of the worm shaft 21, as viewed in the illustrations, is in continuous rotative communication with motor shaft 11 through the medium of the helical gears 12 and 13, as illustrated in FIG. 1, or other suitable gearing. The driven mechanism may preferably include a worm 14 centrally rotatively affixed to the worm shaft 21 and a worm gear 15 in communication with worm 14, as illustrated in FIG. 1. Necessary and appropriate mounting, supporting, enclosing, and controlling devices are assumed to be provided to complete the entity. Such devices are well known and need not be described.

OPERATION

Motor drive

FIG. 3 illustrates the components of the mechanical drive of the present invention in the motor-driving condition, which is the normal state, and it will be convenient to use the motor-drive condition as the starting point for the description of the operation.

The coupling 23 is continuously slidably engaged with the splines of the worm shaft 21 but not with the splines of the handwheel drive sleeve 25. The handwheel drive sleeve 25 is centralized between its two extremes of axial motion relative to the switch flange 34 through the combined influence of the centralizing spring 27, the two thrust washers 26 and 26', the two retaining rings 29 and 30, and the related shoulders. This centralizing of drive sleeve 25 places the trapezoidal ring of material or land 132 of the handwheel drive sleeve in axial conjunction with the locking balls 31 so that no portion of any ball can depend within the bore of the switch flange 34. The switch flange 34 is in its inner-most position, relative to the cartridge cap 35, and the skirted portion 39 is depressing the switch plunger 40 against the urging of the switch spring 41, to actuate the switch 42 so that switch 42 completes the motor electrical circuit. In this arrangement, the outer portion of the outer-most of the balls 31 extends into the most inward of the doubly-beveled grooves 33, 33', i.e., groove 33, in the stationary cartridge cap 35, so that no amount of force which is exerted against the switch flange 34 by the switch spring 41, or which might be exerted by other reasonable considerations, can cause displacement of the locking balls 31 or axial displacement of any other component without destroying the mechanism. The handwheel 43 may be manually rotated at will but the motion cannot be transmitted to the worm shaft 21 because the splines of the coupling 23 and the splines of handwheel drive sleeve 25 are not in communication. Neither can the rotation of the worm shaft 21 cause any motion of the handwheel 43.

Shift from motor drive to handwheel drive

Should the handwheel 43 be pulled outward, in the direction indicated by the arrow in FIG. 5, the retaining ring 29 on the handwheel drive sleeve 25 forces the thrust washer 26 to move against the centralizing spring 27, compressing it against thrust washer 26'. The reaction to this thrust is accepted by the shoulder of the counter bore in the switch flange 34 and transferred by the edge of the holes 131 to the locking balls 31 and thence to the outwardly-directed beveled side of the innermost groove 33 in the bore of the stationary cartridge cap 35. A component of the axial force of spring 27 is directed centripetally by the beveled groove 33, and when, through continued outward axial motion, the handwheel drive sleeve 25 attains a position in which there is axial concourse between the holes 131 and the inward trapezoidal groove 32 of the handwheel drive sleeve, the locking balls 31 are forced to shift positions so that the outer of the balls 31 are within the holes 131 and the inner balls depend into the trapezoidal groove 32 of the handwheel drive sleeve 25. In this state, the force component conditions are somewhat reversed, in that the centralizing spring 27 is still trying to re-establish centralization of the handwheel drive sleeve 25 and switch flange 34, but now that interference between the locking balls 31 and the groove 33 has been eliminated, the switch flange 34 is free to move axially outward, which it does, to the position shown in FIG. 7. This allows the switch spring 41 to extend the switch plunger 40, allowing the switch 42 to break the motor circuit and thereby precludes the possibility of the motor driving the mechanism. The outwardly-directed beveled side of the innermost trapezoidal groove 32 directs centrifugally a component of the force of centralizing spring 27 which causes the locking balls 31 to assume the position shown in FIG. 7 as soon as the switch flange 34 assumes its outermost extreme position.

As seen in FIGS. 5 and 7, axial outward displacement of the handwheel drive sleeve 25 serves to engage the splines 125 with the external splines of the coupling 23, thus rotatively connecting the handwheel 43 to the worm shaft 21, and thereby completing the shift from motor drive to handwheel drive.

If, during the shift from motor drive to handwheel drive, the splines 125 of the handwheel drive sleeve 25 are not in rotative alignment with the mating splines of the coupling 23, the splines will not immediately engage, but the tooth-to-tooth interference will transmit the force of the axial motion of the handwheel drive sleeve 25 to the coupling spring 24, compresssing spring 24, as illustrated in FIG. 6, and allowing the coupling 23 to be pushed outwardly away from contact with retaining ring 22. The force opposing this axial displacement of coupling 23, and originating in spring 24, forces the truncated conical surface on the far or inward side of coupling 23 to funnel into centralizing alignment with the internal splines 125 of the handwheel drive sleeve 25. Subsequent rotation of the handwheel 43 will effect angular alignment of the splines, allowing the coupling spring 24 to push the coupling 23 back to its original position at rest against the retaining ring 22 and simultaneously engaging the splines.

*Shift from handwheel drive to motor drive*

FIG. 8 illustrates the position of the components during the shift from handwheel drive into motor drive. The action is very similar to that described in the transfer from motor drive into handwheel drive, except that (a) the originating force is opposite in direction and the outermost trapezoidal groove 32′ in the handwheel drive sleeve 25 is utilized for locking ball displacement, (b) the alternate shoulder, retaining-ring, combination of the centralizing spring sub-assembly is employed, (c) the connection between the splines of the coupling 23 and handwheel drive sleeve 25 is forcibly disengaged, and (d) the motion of switch flange 34 is oppositely directed.

*Summary*

It will be seen that by the means illustrated in the drawing and described above, I have provided a safe and dependable mechanism for selectively disconnecting the motor drive power and connecting the handwheel drive, and for selectively disconnecting the handwheel drive and connecting the motor drive power, and that the selective drive shift may be accomplished repeatedly without the necessity of aligning coupling parts prior to executing the shift. It will be seen that there is no need for a separate shift lever to achieve the transfer of power, and that there is positive positioning of the component parts to assure proper functioning without increasing the manual effort required to operate the drive.

The mechanism illustrated and described may be summarized as comprising: a cartridge cap or tubular housing 35 having therein a shaft 21 mounted for rotation; a power drive 10, 11, 12, 13 normally connected to the shaft 21 for driving the shaft rotationally; a handwheel drive 43, 25 normally disconnected from, but connectable to, the shaft 21 by axial movement of the handwheel 43, the handwheel drive including a tubular drive sleeve 25 disposed co-axially within the housing 35 and encircling the shaft 21 at spaced separation therefrom, the handwheel drive sleeve 25 having internal splines 125 projecting into the bore of the sleeve for a limited portion of its length; a coupling 23 on the shaft 21 fixed as by splines against angular movement but capable of limited axial movement, the coupling 23 being normally displaced axially from the spline portion 125 of the handwheel drive sleeve 25 and normally out of engagement with the spline 125 but adapted to be placed into engagement therewith by movement of the handwheel drive sleeve 25 axially outward; switch means 42, 41, 40 mounted on the housing 35 and electrically connected to the power drive 10; a switch flange 34 having a skirt 39 disposed to mechanically operate the switch 42 in response to axial movement of the switch flange, the switch flange 34 having a tubular sleeve disposed coaxially within the housing 35 and located concentrically between the housing 35 and the handwheel drive sleeve 25; locking means (balls 31) normally locking the switch flange 34 axially in relation to the housing 35, the locking means 31 being releasable in response to axial movement of the handwheel drive sleeve 25; centralizing spring means 27 coupled to the handwheel drive sleeve 25 and also to the switch flange 34, the spring means 27 being adapted to store energy therein in response to axial movement of the handwheel drive sleeve 25 and to release the stored energy to move the switch flange sleeve 34 and switch flange skirt 39 axially, the axial movement of the switch flange skirt 39 controlling the condition of the switch means 42, 40, whereby the electrical energization and deenergization of the power drive means 10 is controlled according to the axial position of the handwheel 43.

The handwheel drive sleeve 25 and the switch flange sleeve 34 are opposingly counterbored forming shoulders in the sleeves and forming an annular cavity between the sleeves for receiving the centralizing spring assembly. Separate retaining rings 29 and 30 are provided near the distal ends of the counterborings remote from the shoulders. The centralizing spring assembly includes a compression spring 27 disposed between slidable thrust washers 26 and 26′. One of these thrust washers 26′ is spring-pressed against and adapted to engage at least one of the shoulders of the counterborings, and the other of the slidable thrust washers 26 is spring-pressed against and adapted to engage at least one of the separate retaining rings 29 and 30. The centralizing spring assembly allows unlimited rotational movement, but only limited axial movement, of the handwheel drive sleeve relative to the sleeve of the switch flange which is the switch actuating member.

While the apparatus has been illustrated and described in a preferred form, it is to be understood that various modifications may be made without departing from the spirit of the invention as set forth in the claims appended hereto.

Having described my invention, I claim:

1. A mechanical drive comprising: a tubular housing; a shaft within said housing to be driven rotationally; a power drive normally connected to said shaft; a handwheel drive normally disconnected from but connectable to said shaft by axial movement of said handwheel in one direction, said handwheel drive including a tubular drive sleeve disposed co-axially within said housing and encircling said shaft at spaced separation therefrom, said handwheel drive sleeve having internal splines projecting into its bore for a limited axial portion thereof; a coupling fixed on said shaft against angular movement but adapted for limited axial movement, said coupling being normally displaced axially from and out of engagement with said spline portion of said handwheel drive sleeve but adapted to be placed into engagement therewith by movement of said handwheel drive sleeve axially in said one direction; switch means electrically connected to said power drive and having a plunger protruding from said housing; a switch flange having a skirt portion disposed to mechanically operate said switch plunger in response to axial movement of said switch flange, said switch flange having a tubular sleeve portion disposed co-axially within said housing and located concentrically between said housing and said handwheel drive sleeve; locking means normally tending to lock said switch flange sleeve axially in relation to said housing, said locking means being releasable in response to force applied thereto resulting from axial movement of said handwheel drive sleeve; a centralizing spring assembly coupled to said handwheel drive sleeve and also to said switch flange sleeve and tending to maintain said switch flange axially centered relative to said handwheel drive sleeve, the centralizing spring of said assembly being adapted to store energy in response to axial movement of said handwheel drive sleeve and then to release its stored energy to move said switch flange axially to restore the axial relationship of said switch flange and handwheel drive sleeve, the axial position of said switch flange controlling the condition of said switch means, whereby the electrical energization and de-energization of said power drive means is dependent upon the axial position of said handwheel.

2. Apparatus as claimed in claim 1 characterized in that the handwheel drive sleeve and the switch flange sleeve are opposingly counter-bored forming shoulders in the said sleeves and forming an annular cavity therebetween for receiving said centralizing spring assembly, in that separate retaining rings are provided near the distal ends of the counterborings remote from the shoulders, and in that said centralizing spring assembly includes a compression spring disposed between slidable thrust washers one of which is spring-pressed against and adapted to engage at least one of said shoulders and the other of which is spring-pressed against and adapted to engage at least one of said separate retaining rings, said centralizing spring assembly allowing unlimited rotational movement but only limited axial movement of said handwheel drive sleeve relative to said switch flange.

3. Apparatus according to claim 2 in which the locking means includes a plurality of holes through the wall of said switch flange sleeve in a common axial plane at spaced angular positions; a plurality of annular recesses in the walls of said tubular housing and of said handwheel drive sleeve facing said switch flange sleeve, the recesses in said housing wall being normally axially displaced from those in said handwheel drive sleeve wall; and at least one substantially incompressible ball in each of the holes in the switch flange sleeve wall, the total ball diameter in each hole exceeding the length of the hole by an amount substantially equal to the depth of one of said annular recesses, said switch flange sleeve being locked axially in relation to said housing when said balls enter the recesses in said housing wall in axial alignment with an unrecessed portion of said handwheel drive sleeve wall.

4. Apparatus according to claim 3 further characterized in that said annular recesses are of isosceles trapezoidal configuration with the large width facing the switch flange sleeve.

5. Apparatus according to claim 4 in which the coupling is splined to the shaft and a compression spring is provided to bias said coupling to a normal position axially displaced relative to the spline portion of the handwheel drive sleeve.

6. A mechanical drive comprising: a housing having a cylindrical bore; a shaft within said housing bore; a power drive normally connected to said shaft; a handwheel drive normally disconnected from but connectable to said shaft by axial movement of said handwheel to an outward position, said handwheel drive including a cylindrical drive sleeve disposed co-axially within said housing bore and encircling said shaft at spaced separation therefrom, said handwheel drive sleeve having internal splines projecting therefrom near its inward end; a coupling splined to said shaft axially outward of the splined portion of said handwheel drive sleeve when said handwheel drive sleeve is in its inward position but adapted to be placed into splined engagement with said handwheel drive sleeve when the latter is moved to its outward position; switch means for said power drive; said switch means having a movable element for controlling the condition of said switch; a switch actuating member disposed to mechanically engage said switch movable element and having a tubular sleeve portion disposed co-axially within said housing bore between said housing and said handwheel drive sleeve; locking means normally tending to lock said switch actuating member axially in relation to said housing, said locking means being releasable in response to force applied thereto resulting from axial movement of said handwheel drive sleeve; a centralizing spring assembly coupled to said handwheel drive sleeve and also to said switch actuating member and tending to maintain said switch actuating member axially centered relative to said handwheel drive sleeve, the centralizing spring of said assembly being adapted to store energy in response to axial movement of said handwheel drive sleeve and then to release its stored energy to move said switch actuating member axially to restore the axial relationship of said switch actuating member and handwheel drive sleeve, the axial position of said switch actuating member controlling the position of said switch movable element and the condition of said switch.

7. Apparatus as claimed in claim 6 in which the sleeves of the handwheel drive and of the switch actuating member are oppositely counter-bored forming shoulders in the said sleeves and forming an annular cavity between the sleeves for receiving said centralizing spring assembly, in which separate retaining rings are provided near the distal ends of the counterborings remote from the shoulders, and in which said centralizing spring assembly includes a compression spring disposed between slidable thrust washers one of which is spring-pressed against and adapted to engage at least one of said shoulders and the other of which is spring-pressed against and adapted to engage at least one of said separate retaining rings, said centralizing spring assembly allowing unlimited relative rotational movement but only limited relative axial movement between the sleeves of said handwheel drive and of said switch actuating member.

8. Apparatus according to claim 7 in which the locking means includes a plurality of holes through the wall of the sleeve of said switch actuating member; annular recesses in the wall of said housing bore and in the wall of said handwheel drive sleeve, said recesses facing said sleeve of said switch actuating member, the recesses in said housing wall being normally axially displaced from those in said handwheel drive sleeve wall; and substantially incompressible balls in the holes in the wall of the sleeve of said switch actuating member, the total diameter of the balls in the hole exceeding the length of the hole by an amount substantially equal to the depth of one of said annular recesses, said sleeve of said switch actuating member being locked axially in relation to said housing when said balls enter the recesses in said housing wall in axial alignment with an unrecessed portion of said handwheel drive sleeve wall.

9. Apparatus according to claim 8 further characterized in that said annular recesses are of isosceles trapezoidal configuration with the large width facing the sleeve of the switch actuating member.

10. Apparatus according to claim 9 further characterized in that there are two annular recesses in the wall of the housing bore and two annular recesses in the wall of the handwheel drive sleeve, and that the annular recesses are parallel with respect to each other.

11. Apparatus according to claim 10 further characterized in that the wall of the sleeve of the switch actuating member has a thickness equal to one and one-half times the diameter of one ball, in that the depth of the annular recesses is equal to one-half the diameter of one ball, and still further characterized in that there are two balls in each hole in the wall of the sleeve of the switch actuating member.

12. Apparatus as claimed in claim 11 further characterized in that a tubular spring stop is provided intermediate the two slidable thrust washers for limiting the travel of either of the thrust washers relative to the handwheel drive sleeve.

13. In combination; first, second and third hollow cylindrical structures of different diametral dimensions co-axially aligned and interfitted so that a surface portion of each is contiguous with a surface portion of at least one of the other structures; a plurality of holes extending radially through the wall of the intermediate cylindrical structure; spherically-surfaced locking unit means of substantially non-compressible material disposed in each radial hole, the total diametral dimension of the locking unit means exceeding the length of the hole by a substantial portion of the diameter of one of the locking units; a recess in the otherwise contiguous surface of a second of said cylindrical structures for receiving the protruding substantial portion of one of said locking units when the recess is axially aligned with the hole, said recess having a radial depth equal to at least said protruding substantial portion of the diameter of one of said locking units, said recess converging from a large diameter at the contiguous surface to a smaller diameter at the base of the recess, the third of said cylindrical structures when disposed in one axial position relative to said intermediate cylindrical structure presenting an abutment surface for holding said locking units in the lateral holes and associated recess, thereby to interlock said intermediate and second cylindrical structures against relative axial movement with respect to each other, said third cylindrical structure when shifted to a second axial position withdrawing said abutment surface to allow said locking units to be shifted laterally in said radial holes in response to thrust applied in the axial direction of said intermediate cylindrical structure; thereby to unlock the aforesaid interlocking of said intermediate and second structures; and means for applying thrust to said intermediate cylindrical structure.

14. The combination claimed in claim 13 characterized in that the locking units in each hole have a total diametral dimension which exceeds the length of the hole by approximately one-half the diameter of one said locking units, and in that the recess has a radial depth equal to approximately said one-half diameter of the locking unit.

15. The combination claimed in claim 14 further characterized in that said recess has an isosceles trapezoidal cross-section.

16. The combination claimed in claim 14 further characterized in that said spherically-surfaced locking units are steel balls.

17. The combination claimed in claim 15 further characterized in that said spherically-surfaced locking units are steel balls.

18. The combination claimed in claim 16 further characterized in that said thrust means comprises compression spring means.

19. The combination claimed in claim 17 further characterized in that said thrust means comprises compression spring means.

References Cited by the Examiner
UNITED STATES PATENTS 2,324,571  7/1943  Fitz _____ 74—625

MILTON KAUFMAN, *Primary Examiner.*